United States Patent

Wolf

[11] Patent Number: 4,765,910
[45] Date of Patent: Aug. 23, 1988

[54] USE OF AMMONIUM CHLORIDE SOLUTIONS TO REMOVE SULFONATE SURFACTANTS FROM CRUDE OIL

[75] Inventor: Nicholas O. Wolf, Ponca City, Okla.

[73] Assignee: Conoco Inc., Ponca City, Okla.

[21] Appl. No.: 853,317

[22] Filed: Apr. 18, 1986

Related U.S. Application Data

[63] Continuation-in-part of Ser. No. 559,659, Dec. 9, 1983, abandoned, which is a continuation-in-part of Ser. No. 352,404, Feb. 25, 1982, abandoned.

[51] Int. Cl.⁴ ............................................. B01D 17/05
[52] U.S. Cl. ...................... 210/708; 166/267; 208/188; 210/716; 210/737; 252/330
[58] Field of Search ............... 210/634, 638, 639, 708, 210/749, 753, 754, 774, 775, 799, 800, 806, DIG. 5, 716, 737; 166/267, 275; 208/187, 188; 252/330

[56] References Cited

U.S. PATENT DOCUMENTS

| | | | |
|---|---|---|---|
| 1,654,155 | 12/1927 | Ackerman | 208/188 |
| 3,102,100 | 8/1963 | Greenwald | 252/330 X |
| 3,302,713 | 2/1967 | Ahearn et al. | 166/272 X |
| 3,369,602 | 2/1968 | Fallgatter et al. | 166/274 |
| 3,855,116 | 12/1974 | Medem et al. | 208/188 |
| 3,938,591 | 2/1976 | Ossip et al. | 166/275 |
| 4,014,801 | 3/1977 | Fullinwider et al. | 166/305 R X |
| 4,029,570 | 6/1977 | Coffman et al. | 208/188 |
| 4,216,079 | 8/1980 | Newcombe | 208/188 |
| 4,261,812 | 4/1981 | Newcombe | 208/188 |
| 4,374,734 | 2/1983 | Newcombe | 210/708 |

Primary Examiner—Peter Hruskoci
Attorney, Agent, or Firm—C. R. Schupbach

[57] ABSTRACT

Sulfonate surfactants are removed from crude oil or crude oil emulsions, such as may be produced using enhanced recovery methods, by mixing with an aqueous solution of synthetic brine such as ammonium chloride, allowing the phases to separate, and removing the aqueous phase containing brine and sulfonates from the organic phase containing hydrocarbons.

4 Claims, 4 Drawing Sheets

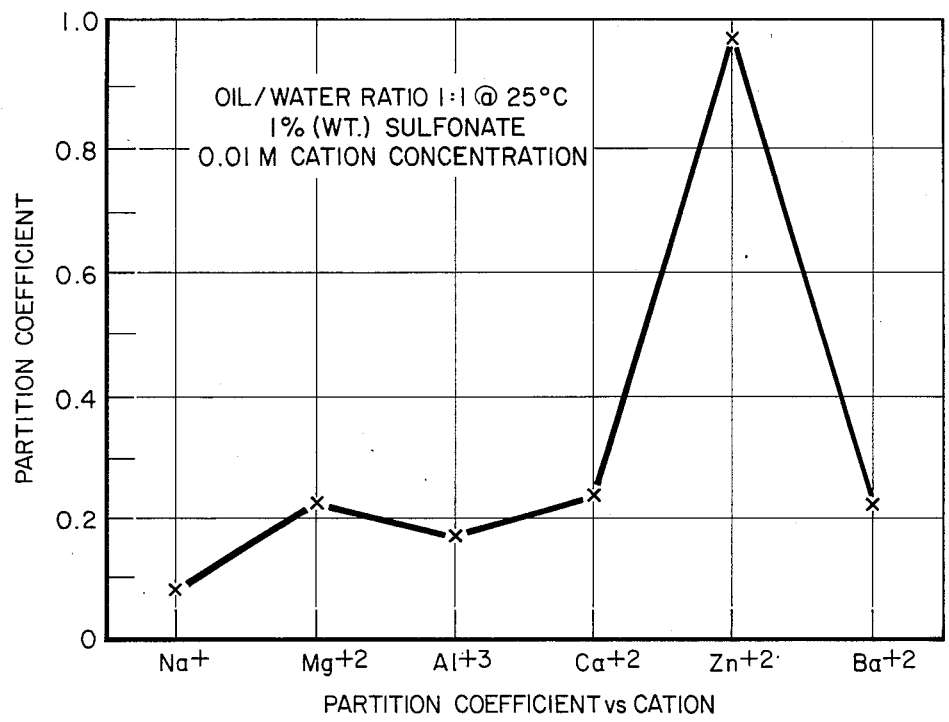

USE OF AMMONIUM CHLORIDE SOLUTIONS TO REMOVE SULFONATE SURFACTANTS FROM CRUDE OIL

This application is a continuation-in-part of application U.S. Ser. No. 559,659 filed Dec. 9, 1983, now abandoned which is a continuation-in-part of application U.S. Ser. No. 352,404 filed Feb. 25, 1982 now abandoned.

This invention relates to secondary or tertiary recovery processes for the recovery of oil from subterranean oil bearing reservoirs. More particularly, this invention relates to an improved process for the recovery of petroleum from underground reservoirs and pertains most particularly to removing sulfonate surfactants from the recovered petroleum.

The primary production of oil from subterranean oil bearing reservoirs is normally obtained by exploiting the natural energy of the reservoir in the form of water drive, gascap drive, solution gas drive and combinations thereof. Oil remaining in the reservoir after primary energy sources have been depleted can be partially recovered by secondary recovery methods. One of the most common secondary recovery methods is waterflooding. Using this method, flooding water is injected into the reservoir through one or more injection wells traversing the oil bearing reservoir. The water displaces the oil in the reservoir and moves it through the reservoir toward one or more production wells from which oil is produced. However, this may recover only 30 to 50% of the remaining oil in place thus leaving considerable quantities of oil behind.

Thereafter tertiary oil recovery is used, one method of which is the use of surface active agents to "scrub" the oil out of the rocks or sands in which the oil is found, permitting displacement of the oil to a producing well. Surfactants which are added are usually petroleum sulfonates or derivatives thereof. These surfactants have a built-in defect. Such surface active agents, while efficient in removing petroleum from a reservoir, are frequently exceedingly difficult to remove from the petroleum once it has been produced.

In many enhanced recovery processes significant amounts of water are produced along with oil in the form of emulsions. The breaking of these emulsions produced in such tertiary recovery operations is difficult because the surfactants and particularly sulfonate surfactants stabilize the emulsions. Such emulsions can be oil in water or water in oil emulsions.

The sulfonate surfactants used in tertiary recovery processes are relatively expensive and add greatly to such recovery costs. These surfactants tend to stay in the oil phase and cause problems in downstream processing units to the extent that such surfactants do not remain in the crude, they become pollutants. Disposal of aqueous streams containing these surface active agents in streams and other bodies of water causes pollution. All these factors have greatly slowed the development of tertiary sulfonate surfactant recovery processes in most countries.

Much art exists on the use of sulfonate surfactants in tertiary petroleum recovery operations. Of more concern, however, is the problem of breaking oil in water emulsions and removing the sulfonates from the recovered petroleum. U.S. Pat. No. 4,029,570 contacts an emulsion with a formation brine to produce a sprung oil phase and a water phase, is most effective for oil in water emulsions characterized by high surfactant contents, and does not deal with surfactant removal. U.S. Pat. No. 4,216,079 provides a process for recovering crude oil, water and surfactants from oil in water emulsions by adding sufficient brine together with a partitioning agent to form three phases. One is an oil phase, with a minor amount of surface active agent, a second is a partitioning agent phase containing most surface active agents, and the third is a brine phase containing a minor amount of surface active agents.

U.S. Pat. No. 4,014,801 discloses a process for breaking polymer containing emulsions by treating with divalent cations such as calcium chloride and a strong oxidizing or reducing agent. The oxidizing or reducing agent is disclosed to be useful to degrade the residual thickening polymer. U.S. Pat. No. 4,029,570 discloses breaking emulsions of crude oil in water by addition of a naturally occurring reservoir brine containing chlorine ions and various alkali and alkaline earth cations. U.S. Pat. Nos. 3,302,713 and 3,369,602 disclose adding certain soluble salts such as ammonium chloride concurrent with surfactant flooding with aqueous sulfonate surfactant mixtures. U.S. Pat. No. 3,855,116 separates emulsions which occur during microbiological dewaxing of petrolerum fractions using brines. The emulsions produced in this fashion contain no sulfonate surfactants.

In addition, there are several well known biochemical salting out techniques involving adding highly ionic salts to aqueous mixtures to separate materials such as protein soaps and the like.

Unfortunately, none of these prior art methods provide an economical efficient emulsion breaking system which will permit separate recovery of the surfactants used in the process and which is easily used. It would therefore be of great benefit to provide a method for recovery of sulfonate surfactants from crude oil or crude oil emulsions produced using enhanced oil recovery techniques.

It is therefore an object of the present invention to provide a simple two-phase method for the removal of sulfonate surfactants from such recovered crude oil or crude oil emulsions. Other objects will become apparent to those skilled in this art as the description proceeds.

It has now been discovered in accordance with the present invention that sulfonate surfactants can be removed from crude oil via a method comprising (a) adding to the crude oil a synthetic brine comprising water and a salt of a general formula $(NH_4)_nX$ wherein X is a halide, nitrate or sulfate and n is 1 or 2 at a concentration of from about 0.005 molar to about 0.1 molar, then (b) stirring or agitating the crude oil and sulfonate emulsion with brine to ensure thorough mixing and producing a mixture of crude oil, sulfonates and brine, thereafter (c) allowing the mixture to separate into two distinct phases (aqueous and organic phases) and removing the aqueous phase to separate brine and a major portion of sulfonates from the organic phase containing hydrocarbons (such as crude oil) and a small amount of residual sulfonates. The aqueous phase is thus predominantly brine and sulfonates and the organic phase is predominantly crude oil.

Other surfactant concentrations in the recovered crude range from 50 parts per million up to 15 weight percent based on the amount of active sulfonate in the total emulsion. The upper limit on a surfactant content is a very high one and normally would never intentionally be encountered in a producing field. However, such high surfactant concentrations might result from a fracture occurring around an injection well wherein the formation causing bypassing of the surfactant more or less directly to a producing well. When such an event occurs, a recovery operator will be faced with an emulsion which is extremely difficult to break. The emulsions also will contain valuable sulfonate which, if recovered, can be profitably reused.

The art abounds with surface active agents effective in tertiary oil recovery. The exact surface active agent used will be a matter of a particular reservoirs specific gravity of the oil, the reservoir temperature cost of the sulfonate, and the like. However, representative but non-exhaustive examples of suitable surface active agents are petroleum sulfonates, alkyl sulfates, alkyl sulfonates, alkyl aryl sulfonates, alkyl phenoxy sulfates, and sulfated alcohol ethoxylates, sulfated alkyl phenoxy ethoxylates, non-ionic sulfate surfactants and the like. The surfactants to which the present invention is most applicable are those having a molecular weight of about 600 gram/equivalents or less.

The instant invention depends upon the use of a synthetic brine prepared by using fresh water containing substantially no detrimental salts and adding to it a salt having the general formula $(NH_4)_nX$ wherein X is selected from the group consisting of halide or nitrate and where n is equal to the valence of the sulfate, halide or nitrate. Representative but non-exhaustive examples of salts effective in the process of the present invention are ammonium chloride, ammonium sulfate, ammonium bromide, ammonium iodide, ammonium nitrate and mixtures of these. For purposes of economics, availability, and effectiveness of operation, ammonium chloride is the most preferred salt.

Fresh water is important in the preparation of the brine. Too great an ionic strength in the water will cause the partially organic surfactant molecules to shun the water. This is true for naturally occurring salts in produced waters and any added salts, including $NH_4^+$. Normally the salt is added to the water to form a synthetic brine wherein the $NH_4^+$ concentration ranges from about 0.005 molar to 0.10 molar, with 0.05 molar preferred.

Once formed, the brine is added to the crude oil at a volume ratio of from about 10:1 to about 1:10, respectively, depending upon the surfactant concentration. Once added, the synthetic brine and the crude emulsion are thoroughly mixed to ensure thorough contacting of the synthetic brine with the crude. Two phases, aqueous and organic (crude oil or petroleum) are then allowed to separate. The major fraction of the surfactant remains in the aqueous phase where it is easily removed for further treatment, disposal or recovery.

The process can be applied in a single stage treatment. However, normally at least two stages will be used. The two-stage process was shown to remove more than 99% of the sulfonate surfactant.

Care must be taken during stirring that no severe agitation is imparted to the synthetic brine/petroleum mixture as this will only enhance emulsion formation. However, once a gentle agitation and thorough mixing has been obtained, separation into two phases is readily achieved, allowing substantially complete recovery of the sulfonate surfactant in the synthetic brine. No partitioning agent or additives are necessary.

Normally the agitation and separation should be carried out in a relatively narrow temperature range of from about 90° F. to about 150° F. The temperature dependence of the solubility of salts of sulfonates generally drives more sulfonate into the oil as temperature goes up. However, heat is needed during treating to lower the viscosity of the fluids and generally promote separation of the two phases. These factors make the temperature used a compromise between viscosity needs and sulfonate removal, where from 90° F. to 150° F. appears best.

The instant process thus uses the ammonium ion to react with the sulfonate surfactants in the produced crude to form an ammonium sulfonate. The ammonium sulfonate is water soluble and partitions into the water phase of a crude/water system. The water containing sulfonate can then be disposed or reused. Greater than 99% of the sulfonate in crude can be removed with this method. The halide, nitrate, or sulfate ions present are only spectator ions and play no part in the removal of the surfactant.

The effect of the present invention is distinctly surprising since the ammonium salts do not have the same effect on sulfonate partitioning as calcium, sodium, potassium, magesium and other metal salts. Ammonium ion appears to form a more water soluble species than the metal ions, which tend to form less water soluble species. However, concentration affects must be carefully watched since at ionic concentrations greater than 0.1 molar, the ionic strength of the aqueous phase is too large and all cations tend to force the sulfonate into the oil. Thus it is necessary that the synthetic brine be carefully controlled in concentrations.

The salts of the present invention are not used as emulsion breakers, either alone or with oxidizing reducing agents or other surfactants. The instant process is not directly an emulsion breaker, but rather uses the sulfonate surfactant removal to decrease the ability of the various materials to maintain an emulsion. Thus no direct emulsion breaking occurs, although emulsions are much more easily separated once the surfactant has been removed.

Likewise, the present invention distinctly differs from the well-known biochemical salting out techniques in which a liquid phase is treated to remove a polymer/surfactant material. Biochemical salting techniques use a variety of salts, usually NaCl to dehydrate polymeric material in water via an osmosis step. The dehydrated polymer is less soluble and is removed as a solid. In contrast, the present invention utilizes the higher solubility in water of the ammonium salt of the sulfonate surfactant as compared to the oil phase, which allows the sulfonate to partition into water where it can be drained and disposed.

The invention is more concretely described with reference to the examples below wherein all parts and percentages are by weight unless otherwise specified. The examples are provided to illustrate the present invention and not to limit it.

Experiments were carried out to give a semiquantitative description of the equilibrium of the crude oil surfactant and brine system. Temperatures, surfactant concentration, and brine composition were varied in their effect on the equilibrium partitioning of the surfactant was noted. The specific chemical system used was a mixture of Big Muddy Wall Creek crude oil and synthetic brine with a surfactant package used as a solute. The surfactant package was a multi-component blend of two different linear alkyl sulfonates, alcohol, brine and unreacted oils. Sulfonate content varied in the range of 56 to 58% active sulfonate and the alcohol content was about 16%. No polymer thickener was present in the surfactant.

EXAMPLE

Synthetic brines were prepared by adding reagent grade salts to distilled water. A brine containing 0.6% NaCl was used to similate the ionic strength of natural reservoir fluids. In cases where a cation type was a variable the brines were prepared on the basis of equal molar concentrations instead of equivalent ionic strengths.

The general procedure was used in all experiments. The brine at a selected composition was prepared and mixed with Big Muddy crude oil. The surfactant was then added to this mixture as a weight percent active sulfonate. The resulting blend was then agitated moderately hard for two hours on a lab shaker and allowed to separate at 25° C., 60° C. or 99° C. The mixture was considered separated when a sharp inner phase appeared and phase volumes were constant for 18 to 24 hours. It was not possible in most cases to achieve complete phase separation. Residual water up to 1.0% remained in the oil due to the solubilizing action of the surfactant and co-surfactants.

After separation the phases were sampled and analyzed for sulfonate content and water content (oil phase only). The equivalent weight of the sulfonate fraction was also determined. Sulfonate analysis was by methylene blue titation for both phases.

The general result of the experiments was to show the partition coefficient to be a function of the temperature and sulfonate concentration of the system and a strong function of ionic strength and compositon of the brine.

BRIEF DESCRIPTION OF THE FIGURES

FIG. 7 shows that different metal cations can raise or lower the partition coefficient depending on physical properties of the cations.

DETAILED DESCRIPTION OF THE DRAWINGS

Figure 1:
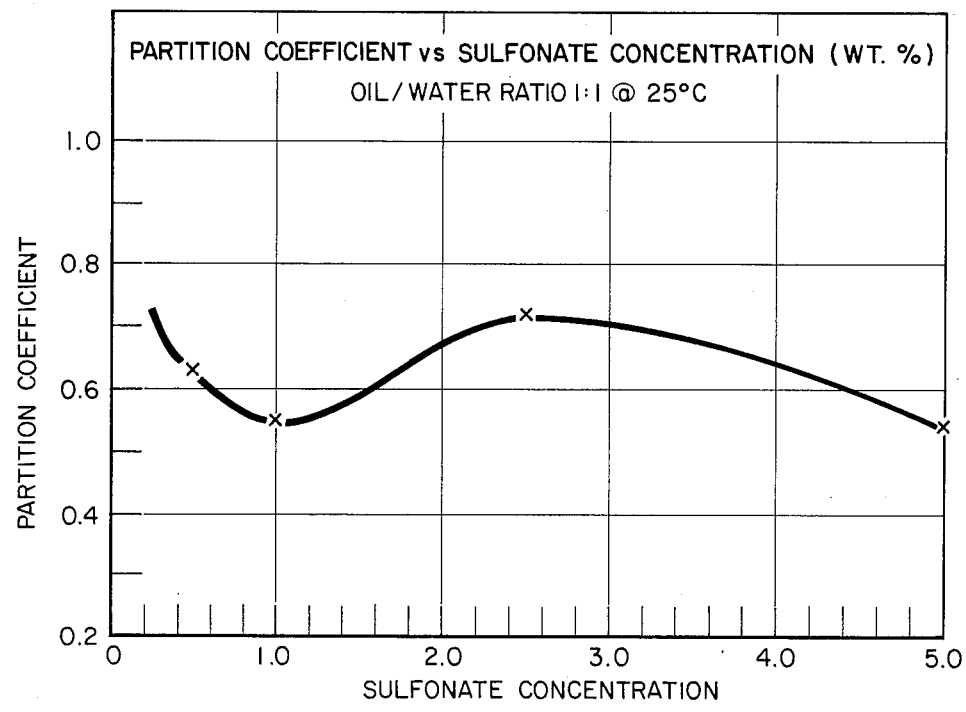
FIG. 1 shows the change in partition coefficient with sulfonate concentration.

FIG. 1 is a graph showing the change in partition coefficient with sulfonate concentration. When carried out at 25° C. the partition coefficient shows a minimum near 1.0% and a maximum in the neighborhood of 2.5% sulfonate. Variation is not large and it is important to note that the partition coefficient is not very strong with surfactant concentration. This graph closely approximates ideal solution behavior in a slightly non-ideal surfactant solute.

Figure 2:
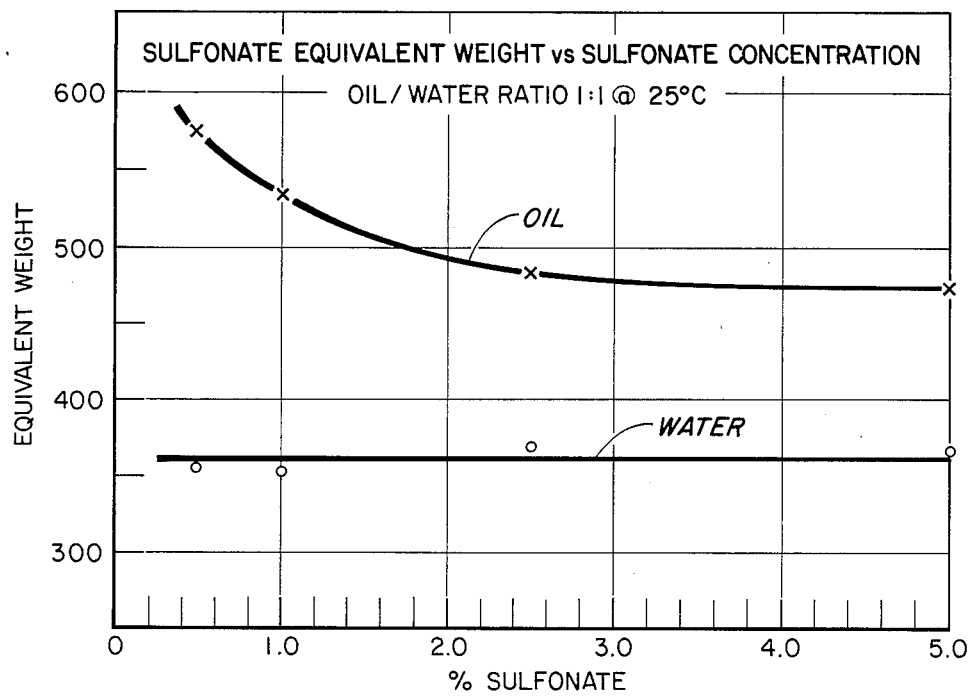
FIG. 2 shows that partitioning is changing with surfactant concentration.

FIG. 2 shows that partition changes with surfactant concentration which is not shown by FIG. 1. The graph shows the two surfactant fractions partitioned into the oil and brine phases by determining the average equivalent weight of the surfactant in both phases. As the overall sulfonate concentration increases, a decrease in the average equivalent weight of the sulfonate in water is noted. This appears to show that higher equivalent weight fractions are partitioning more into the brine than into the oil. Little change is seen in the distribution of the brine.

Figure 3:
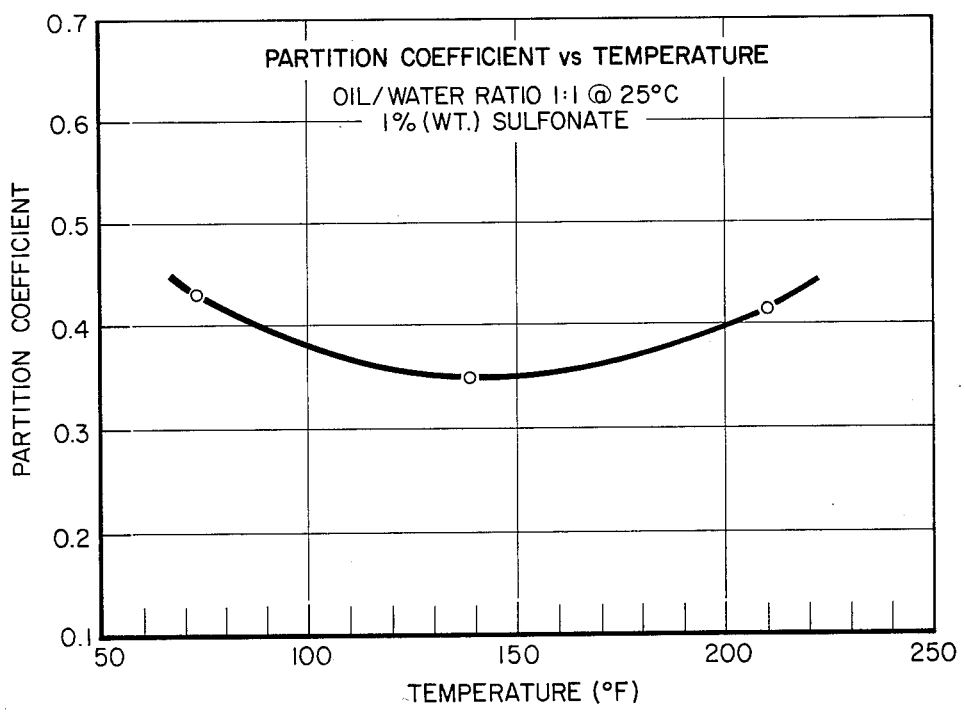
FIG. 3 shows temperature dependents of partitioning coefficient.

FIG. 3 shows the temperature dependence of the partition coefficient as the temperature increases from 25° C. the partition coefficient slowly decreases to a minimum and then again slowly increases thereafter. Ideally, the temperature variation should follow a curve other than a parabola. While the reasons for such an effect are speculative and I do not wish to be bound thereby, it is believed that the temperature of the surfactants and the cloud point of the paraffinic unreacted oils are effecting the solubility of the surfactant in the temperature range.

While not ideally predictable, the shape of this temperature curve is consistent with general field experience where I have found that low heat (100° to 120° F.) aids in the removal of sulfonate from produced emulsions while higher heat levels are detrimental.

Figure 4:
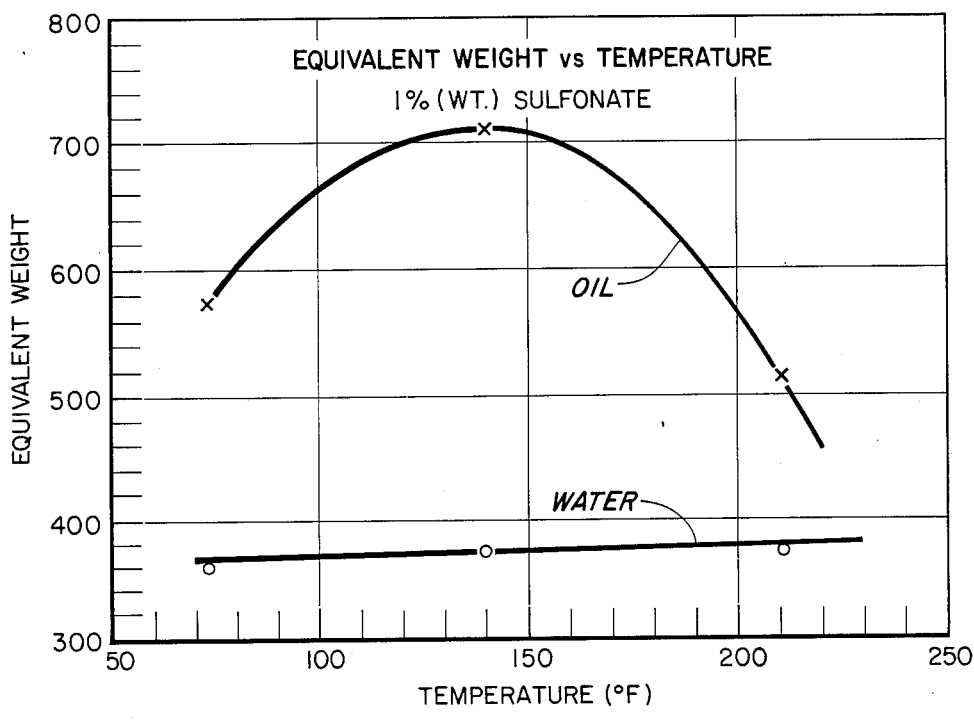
FIG. 4 shows a corresponding sulfonating equivalent weight changes in the two phases.

FIG. 4 shows the corresponding sulfonate equivalent weight changes in two phases, wherein the majority of the change in the oil phase fractions and little change in the brine. FIG. 4 clearly shows the relation between sulfonate equivalent height and solubility in the oil phase wherein the higher molecular weights are more soluble in oil.

Figure 5:
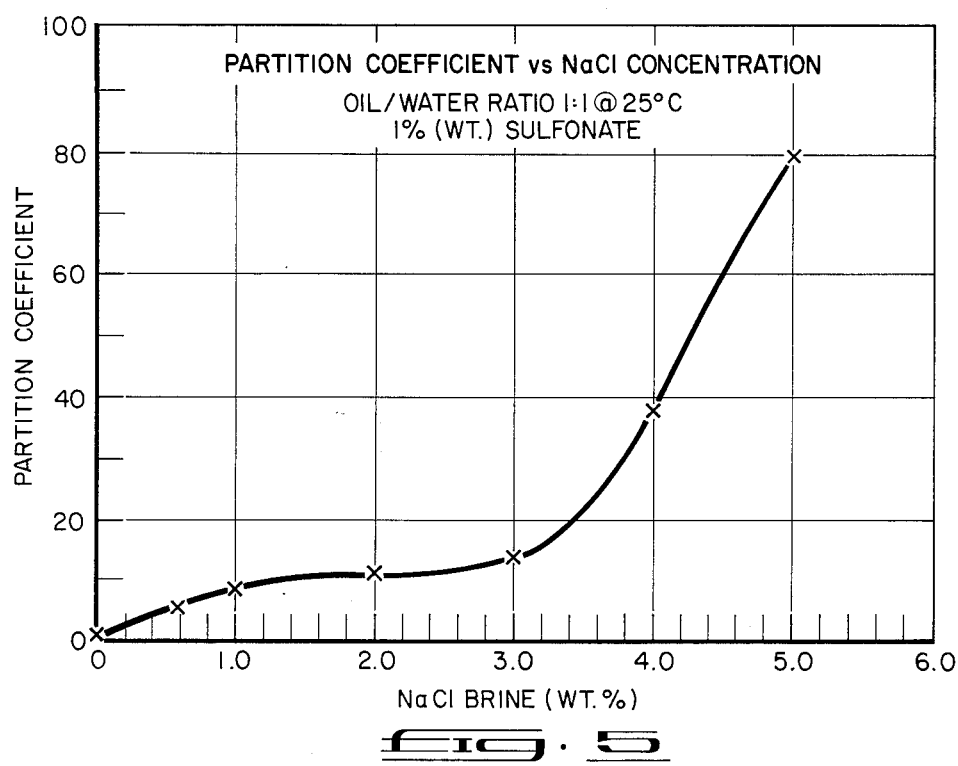
FIG. 5 shows the effect of brine strength on partition coefficient.

FIG. 5 shows the effect of brine strength on the partition coefficient, the strongest effect of all studied. By varying the concentration of NaCl in the brine, the partition coefficient ranges from 0.05 in fresh water to 7.9 at 5.0% sodium chloride. The effect is most strongly notable in the range of 0 to 1.0% sodium chloride and 3.0 to 5.0% sodium chloride. The region between shows little change in the partition coefficient with significant changes in brine strength similar to a buffer effect in acid base system. Therefore, it is preferred to operate with a freshest water possible to minimize the partition coefficient and maxsulfonate recovery in the water. In practice, however, produced water contains sufficient salt to place any actual recovery in the plateau region of the curve.

Figure 6:
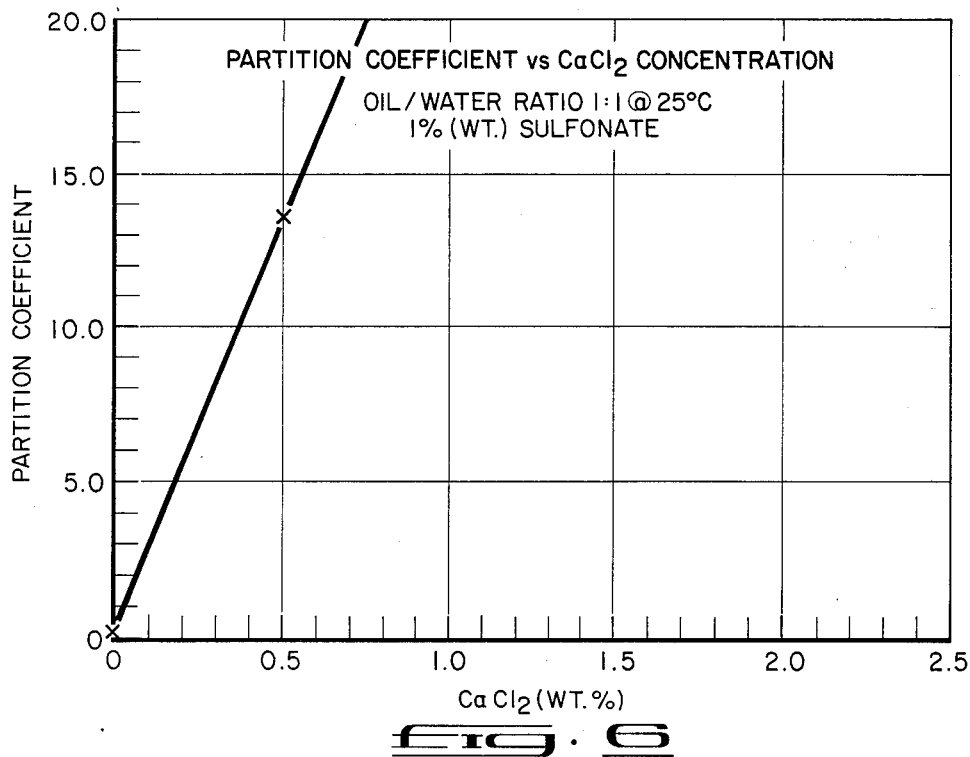
FIG. 6 shows that ion type and brine influences partitioning of the surfactant.

FIG. 6 shows the type of ion in the brine greatly influences surfactant partitioning. The effect of calcium ion is shown in this figure wherein it is very clear that calcium has an even greater detrimental effect than sodium. A comparison of FIGS. 5 and 6 illustrates the detrimental effect of calcium presence. The change in partition coefficient with concentration of calcium chloride relative to the sodium chloride is much greater than can be attributed to cationic charge alone.

FIG. 7 shows that different metal cations raise or lower the partition coefficient depending on the physical properties of the cation. This figure shows that cationic charge alone does effect the partitioning behavior but that other effects are also felt. It is believed that factors such as ionic radius of hydration and the like appear in the results of the partition.

Therefore, treating produced oil to reduce sulfonate surfactant levels will require careful control of composition and ionic strength of the synthetic brine in contact with the crude, together with the heating temperature control for optimum results. In order to reduce the salinity of produced brine, a fresh water wash can be included in the treating process. The most preferable treating ranges are from 100° to 110° F. to facilitate emulsion separation and promote sulfonate partitioning into the brine.

While certain embodiments and details have been shown for the purpose of illustrating this invention, it will be apparent to those skilled in this art that various changes and modifications may be made herein without departing from the spirit or scope of the invention.

I claim:

1. A method for removal of sulfonate surfactants having a molecular weight of about 600 gram/equivalents or less from crude oil or crude oil emulsions containing from 50 parts per million up to 15 weight percent said surfactants, comprising
   (a) adding a synthetic brine having an $NH_4^+$ concentration of from about 0.005 molar to about 0.1 molar to crude oil or crude oil emulsions containing said sulfonate surfactants, said brine comprising water and at least one salt selected from the group consisting of $(NH_4)_nX$, where X is at least one ion selected from the group consisting of sulfate, nitrate or halide and n is the valence of X, said brine being prepared from fresh water containing substantially no detrimental salts selected from the group consisting essentially of Na, Mg, Al, Ca, Zn, and Ba salts;
   (b) agitating at a temperature of from about 90° F. to about 150° F. the crude oil or crude oil emulsions containing sulfonate surfactants and synthetic brine to ensure thorough mixing and react said $NH_4^+$ with said sulfonate surfactants and produce a mixture containing water soluble ammonium sulfonate, and
   (c) allowing the mixture of (b) to separate into aqueous and organic phases, said aqueous phase containing predominantly brine and amononium sulfonate, and removing the aqueous phase containing predominately brine and sulfonates from the organic phase containing predominately crude oil.

2. A method as described in claim 1 wherein the synthetic brine is formed using at least one salt selected from the group consisting of ammonium chloride, ammonium sulfate, ammonium bromide, or ammonium nitrate.

3. A method as described in claim 2 wherein the brine is added to the crude oil or crude oil emulsions at a volume ratio of from about 10:1 to about 1:10 respectively.

4. A method as described in claim 3 wherein the crude oil or crude oil emulsions is subjected to successive washes with a synthetic brine.

* * * * *

UNITED STATES PATENT AND TRADEMARK OFFICE
CERTIFICATE OF CORRECTION

PATENT NO.   :   4,765,910
DATED        :   August 23, 1988
INVENTOR(S)  :   Nicholas O. Wolf It is certified that error appears in the above-identified patent and that said Letters Patent are hereby corrected as shown below:

Column 6, line 27, "height" should be --weight--.

Signed and Sealed this

Tenth Day of January, 1989

Attest:

DONALD J. QUIGG

Attesting Officer

Commissioner of Patents and Trademarks